United States Patent [19]

Naaktgeboren

[11] Patent Number: 4,791,865
[45] Date of Patent: Dec. 20, 1988

[54] BALE DISCHARGE MECHANISM FOR PLUNGER TYPE AGRICULTURAL BALERS

[75] Inventor: Adrianus Naaktgeboren, Zedelgem, Belgium

[73] Assignee: Ford New Holland, Inc., New Holland, Pa.

[21] Appl. No.: 111,378

[22] Filed: Oct. 20, 1987

[30] Foreign Application Priority Data

Oct. 24, 1986 [EP] European Pat. Off. ........ 86201861.1

[51] Int. Cl.⁴ .......................... B30B 9/30; B30B 15/32
[52] U.S. Cl. ...................................... 100/218; 100/50; 100/188 R; 100/191
[58] Field of Search .................... 100/218, 50, 188, 45, 100/7, 191; 56/341

[56] References Cited

U.S. PATENT DOCUMENTS 3,426,672  2/1969  Nolt ........................................ 100/4
3,859,909  1/1975  Mast ................................... 56/341 X
4,037,528  7/1977  White et al. ......................... 100/191
4,091,603  5/1978  Oosterling et al. .............. 100/188 R
4,334,466  6/1982  Spiegelberg ............................ 100/4
4,489,648 12/1984  Naaktgeboren ..................... 100/191

FOREIGN PATENT DOCUMENTS 1283688 10/1960  France .
1087450 10/1967  United Kingdom .
1270613  4/1972  United Kingdom .

Primary Examiner—Andrew M. Falik
Attorney, Agent, or Firm—Darrell F. Marquette; Frank A. Seemar; Larry W. Miller

[57] ABSTRACT

An agricultural baler comprising a bale case and a plunger reciprocable in the bale case for, in use of the baler, forming crop material into bales and moving bales along the bale case towards the discharge end thereof for ultimate discharge therefrom. A pair of slides in the bale case are operable to engage a formed or partially formed bale in the bale case and move it therealong towards the discharge end thereof independently of the operation of the plunger.

Tines pivotally mounted on the slides are urged by springs into an operative position to engage bales in the bale case. The tines may be retracted to an inoperative position.

14 Claims, 6 Drawing Sheets

BALE DISCHARGE MECHANISM FOR PLUNGER TYPE AGRICULTURAL BALERS

BACKGROUND OF THE INVENTION

This invention relates to agricultural balers and more particularly to balers which produce rectangular bales of crop material as opposed to round bales.

In so-called rectangular balers, bales are formed by compressing wads of crop material in a bale case or chamber by a plunger which is reciprocable within the bale case; the wads of material being fed to the bale case from a feeder duct or chamber. In order for the wads of crop material acted upon by the plunger to form a cohesive whole, some resistance must be offered to the plunger and conventionally, this has been provided by the last bale to be formed which is maintained in the bale case after having been wrapped and tied with twine or the like. As the new bale is formed and progresses along the bale case, it pushes the already formed bale further along until the latter is finally discharged from the machine and the newly completed bale, which meanwhile also has been wrapped and tied, provides the plunger resistance for the next bale.

In the past, the full or partial bale still in the machine at the end of a baling session has been left therein so as to provide the plunger resistance at the commencement of the next baling session. Alternatively, if further baling is not due for some considerable time, then the full or partial bale has been manually pulled from the machine. However, these procedures cannot be followed, at least not without considerable difficulties, when crop with a high moisture content, such as silage, is being baled. This is because the full or partial bale left in the baler at the end of a baling session should not remain in the machine for any length of time, even overnight, because, firstly the crop material will commence to ferment with consequential deterioration of the crop material and secondly, the high moisture content increases significantly the onset of rust in the machine.

Furthermore, it is becoming commonplace for balers to be made larger so as to produce larger bales to an extent that the weight thereof is such that it is virtually impossible manually to pull even a partial bale from the machine. Apart from the weight, the coefficient of friction between the moist crop material and the bale case is relatively high, thus further hindering manual extraction of the bale from the machine. Also, with the advent of large rectangular balers producing large bales, the volume of a full bale is such that it comprises too much crop material to be left in the baler as this crop material may be be lost. This problem is particularly relevant for contract operators who may operate the machine for a plurality of farmers on the same day. These farmers may not want to accept the fact that a full bale is left in the baler after finishing their baling operation and is lost to them.

It is an object of the present invention to provide a convenient solution for all these problems in the form of providing a means for easily removing the last full bale and/or partial bale from the bale case at the end of each baling session.

SUMMARY OF THE INVENTION

According to the present invention there is provided an agricultural baler comprising a bale case and a plunger reciprocable in the bale case for, in use of the baler, forming crop material into bales and moving said bales along the bale case towards the discharge end thereof for ultimate discharge therefrom, and an improvement which comprises bale-discharge means associated wtih the bale case operable to engage a formed or partially formed bale in the bale case and move it therealong towards the discharge end thereof independently of the operation of the plunger. Preferably, the bale-discharge means comprise reciprocable and retractable bale-engaging means associated with at least one wall of the bale case and which are operable, during one stroke of reciprocation, in an operative mode to engage a formed or partially formed bale in the bale case and move it therealong towards the discharge end thereof and, in an inoperative mode, to disengage said bale. The bale-engaging means are operable to extend into the bale case during the operative mode to engage said bale therein and to retract from the bale case during the inoperative mode to disengage said bale.

The bale-discharge means may comprise reciprocable slide means on which are pivotally mounted, at regular intervals along the length thereof, bale-engaging means which extend into and engage a bale in the operative mode of operation of the bale-discharge means. Spring means may extend between the slide means and the bale-engaging means to resiliently load said bale-engaging means such that they are urged towards the operative position and the bale-engaging means may be provided with stop means which are engageable with the slide means so as to limit pivotal movement of the bale-engaging means in at least one direction.

Preferably, the slide means comprise two generally parallel slides which extend longitudinally of the bale case and which are interconnected for reciprocation in unison. The bale-engaging means may be formed by pairs of tines of generally triangular shape as seen in plan view and each pair of tines may be mounted via a common pivot on a respective slide. The stop means may be formed by a pin attached to at least one tine of each pair of tines and said pin is engageable with the respective slide and also serves as an anchor point for one end of the spring means. The bale-engaging means are spaced along the slide means relative to the stroke of reciprocation of the bale-discharge means so that a given bale-engaging means does not re-engage a bale at the same location previously engaged by an adjacent bale-engaging means. The bale-discharge means are reciprocated by a double-acting hydraulic actuator.

The baler further also may comprise bale density control means including tensioning rails forming part of the bale case, and a further hydraulic actuator operable to move the tensioning rails towards each other to control the density of a bale being formed in the bale case; whereby the hydraulic actuator of the cable-discharge means and the further hydraulic actuator of the bale-density control means forming part of a hydraulic circuitry which further comprises control valve means coupled between said actuator and further actuator for automatically shifting the further actuator to the bale-density release position when the actuator of the bale-discharge means is energized for operating said bale-discharge means so as to maximize the cross-sectional area of the bale case.

DESCRIPTION OF THE DRAWINGS

An agricultural baler in accordance with the present invention will now be described in greater detail, by way of example, with reference to the accompanying drawings, in which.

DESCRIPTION OF THE PREFERRED EMBODIMENT

The terms "forward", "rearward", "left" and "right" used in connection with the baler and/or components thereof are determined with reference to the direction of forward operative travel of the baler and should not be considered as limiting. Also the terms "upper" and "lower" are used principally throughout this specification for convenience and it should be understood that these terms equally are not intended to be limiting.

Figure 1:
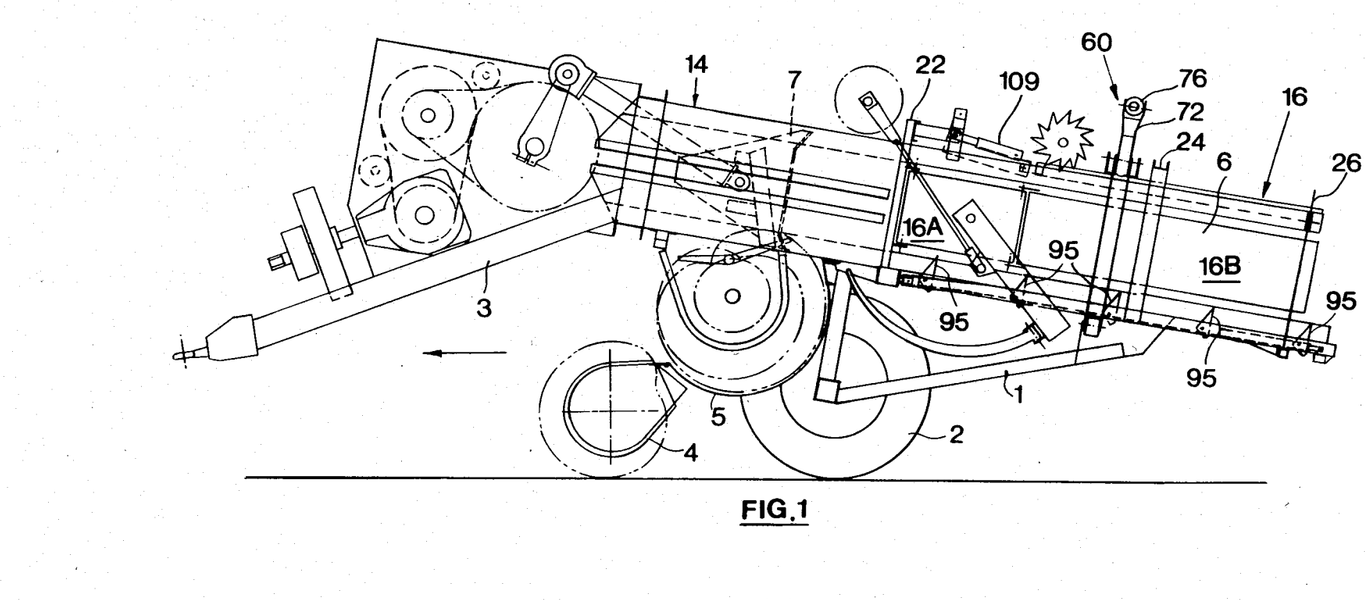
FIG. 1 is a side elevational view of the baler.

Referring first to FIG. 1, the baler is basically conventional in that it comprises a main frame 1 fitted with a pair of ground-engaging wheels 2 and a tow bar 3. A pick-up mechanism 4 picks up crop material from the ground and delivers it to a feed chamber 5 from where it is transferred to a bale case or chamber 6 in which a bale of crop material is formed. Details of the feed chamber and of the feeder means associated therewith can be seen in U.S. Pat. No. 4,525,991 granted July 2, 1985, the description of which is hereby incorporated by reference. A plunger 7 is reciprocable within the bale chamber 6 to act upon and compress wads of crop material transferred from the feed chamber 5 into a bale which moves progressively along the bale chamber from left to right as seen in FIG. 1. A completed bale is tied with twine or the like and discharged from the machine.

Figure 2:
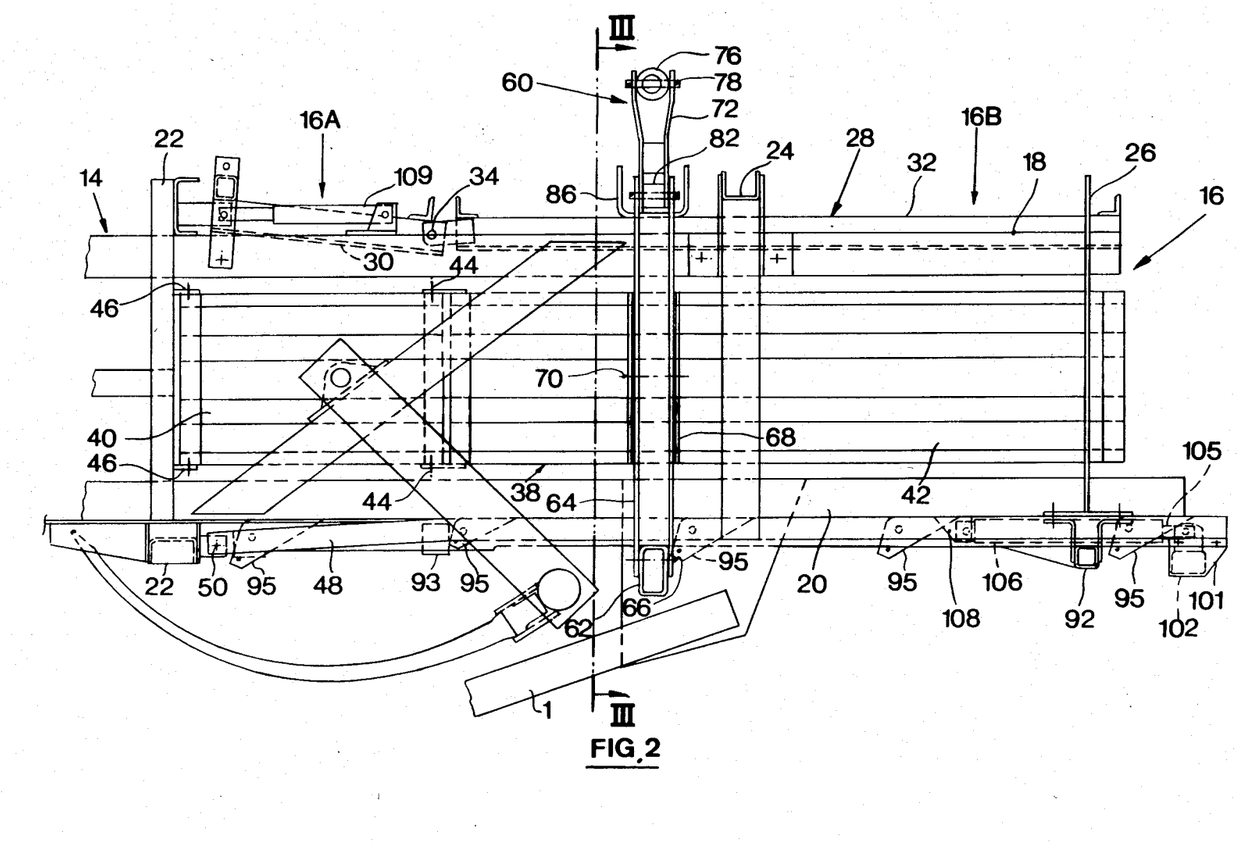
FIG. 2 is an enlargement of part of FIG. 1 with certain components removed and with the bale-engaging means subject of the invention in a retracted position.

The construction of the bale chamber 6 is as disclosed in Applicant's U.S. Pat. No. 4,489,648 granted Dec. 25, 1984, and in co-pending U.S. application Ser. No. 020,850 filed Mar. 2, 1987, to which reference is made and the description of which equally is hereby incorporated herein by reference. More specifically, and referring to FIGS. 2 to 5, the bale chamber 6 comprises a forward portion 14 with fixed dimensions (only a small portion of which is shown in FIG. 2) and a rearward portion 16. The rearward portion 16 includes upper corner rails 18 and lower corner rails 20 which are held stationary by collar-like frames 22, 24, 26 which extend around the outside of the bale chamber 6 and are rigidly connected, such as by bolts or welding, to the corner rails 18, 20. The bale chamber rearward portion 16 also includes a top center rail 28 comprised of a first section 30 and a second section 32 pivotally connected together at 34, the first section 30 also being pivotally connected to the frame 22. The bale case rearward portion 16 further includes identical, opposed side rails 38 each formed of a first section 40 and a second section 42 pivotally connected together by pins 44. The first section 40 of each side rail 38 is also pivotally connected to the frame 22 by pins 46. Finally, the bale chamber rearward portion 16 also has a bottom rail 48 fixed at 50 to the frame 22.

Figure 3:
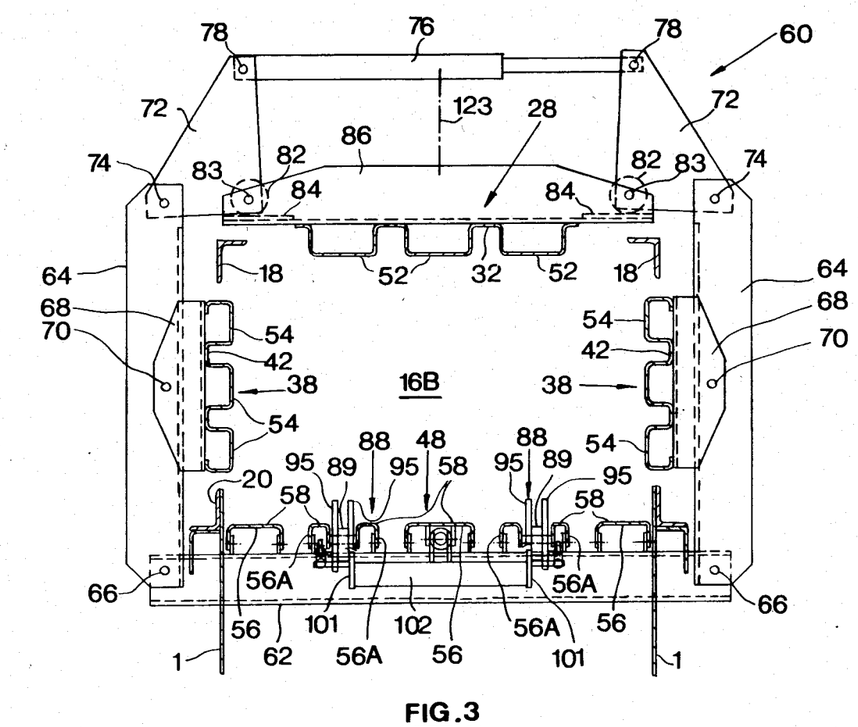
FIG. 3 is a section on the line III—III of FIG. 2 but with the bale-engaging means subject of the invention in a position penetrating into the bale case.

The first and second sections 30, 32 of the top rail 28 and the first and second sections 40, 42 of the side rails 38 are each preferably formed of a piece of sheet metal folded into a corrugated pattern as best seen in cross-section in FIG. 3. The top rail first and second sections 30, 32 have relatively flat surfaces 52 which engage the top of a bale moving through the bale case 6. The side rail first and second sections 40, 42 have relatively flat surfaces 54 which engage the sides of a bale moving through the bale case 6. The bottom rail 48 includes a series of inverted generally U-shaped channel members 56 arranged side-by-side. The bottom rail members 56 have relatively flat surfaces 58 on which a bale rests while moving through the bale chamber 6. The rails 28, 38 and 48 provide, in part, the effective walls of the bale chamber 6 and constitute the conventional so-called tension rails.

The top rail first section 30 and the underlying portion of the bottom rail 48 are inclined relative to each other so that the vertical distance between their opposed surfaces 52 and 58 gradually decreases from left to right as seen in FIG. 2. The side rail first sections 40 also are inclined relative to each other so that also the horizontal distance between their opposed surfaces 54 gradually decreases from left to right as seen in FIG. 2. The top rail second section 32 and the underlying portion of the bottom rail 48 are maintained generally parallel to each other so that the vertical distance between their opposed surfaces 52 and 58 is substantially constant from left to right as seen in FIG. 2. Also the side rail second sections 42 are maintained generally parallel to each other so that also the horizontal distance between their opposed surfaces 54 is substantially constant from left to right as seen in FIG. 2.

With the top rail 28, the side rails 38, and the bottom rail 48 formed and arranged as described above, the bale chamber rearward portion 16 has a chamber area 16A of gradually tapering height and width, and a chamber area 16B of substantially uniform height and width. As is well known in the baler art, this helps to form bales which are of a satisfactory density but with no distortion in shape.

A control mechanism 60 is provided for changing the positions of the first and second sections 30, 32 of the top rail 28 and for changing the positions of the first and second sections 40, 42 of the side rails 38 so as to adjust the relative positions of the top and bottom rails 28, 48 and the opposed side rails 38, respectively, and thus also to adjust the shape and dimension of the chamber area 16A as well as the dimension of the chamber area 16B of the bale chamber rearward portion 16, thereby to adjust bale density. The control mechanism 60 includes a bottom beam member 62 which forms part of the main frame 1, extends transversely of the bale chamber rearward position 16 and is located underneath the bottom rail 48. The control mechanism 60 further also comprises linkage or side members 64 pivoted at their lower ends by pins 66 to the outer ends of the bottom member 62. Brackets 68, pivoted by pins 70 to the linkage members 64, are rigidly attached to the side rail second sections 42. The side members 64, brackets 68 and pins 70 also provide the main support for the side rail first and second sections 40, 42. Lever members 72 are pivoted by pins 74 to the upper ends of the linkage or side members 64.

Power means in the form of a hydraulic cylinder unit 76 of contracting type, is pivotally connected at its ends by pins 78 to the lever members 72. The lever members 72 carry rollers 82 on pins 83 which engage portions 84 of a top member 86 that is located above, and secured to, the top rail second section 32. The top member 86 also supports the top rail first and second sections 30, 32. The bottom member 62 is preferably of generally rectangular cross-section while the side members 64 and the top member 86 are preferably of generally U-shaped cross-section.

The control mechanism 60 is operated by contracting the hydraulic actuator unit 76 and the precise details, which form no part of the present invention, are disclosed in the previously referred to co-pending U.S. application Ser. No. 020,850 filed Mar. 2, 1987.

Figure 4:
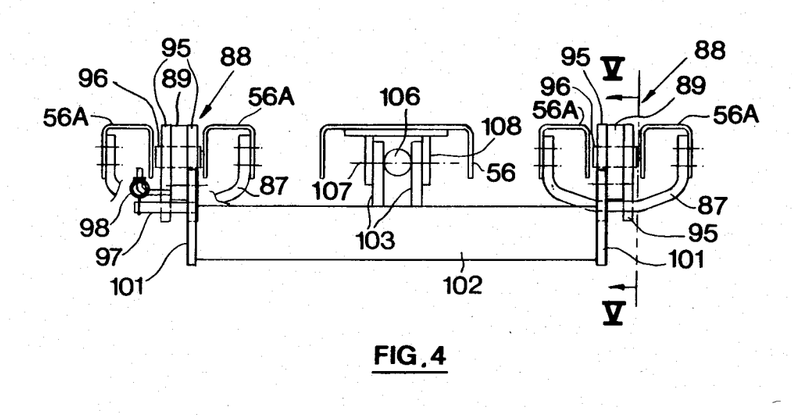
FIG. 4 is an enlarged detail of FIG. 3 but with the bale-engaging means subject of the invention in the position shown in FIG. 2.

The bottom rail 48 is made up of five channel members 56 and of these, the two on either side of the central rail are split into two as seen in FIGS. 3 and 4, the two portions being designated 56A and being interconnected by generally U-shaped brackets 87. Between the two portions 56A of each of the two split channel member 56 there is mounted bale-engaging means 88 which comprise two parallel slides 89 extending longitudinally of the bale case 6. Each slide 89 is supported for sliding movement on two spaced transverse beams, i.e. the beam 62 shown in FIGS. 2 and 3 and a beam 92 of the main frame 1 shown in FIG. 2 and on brackets 93 also attached to the main frame 1. The underside of each slide 89 is recessed at 94 to receive the upper surface of the transverse beam 62.

Figure 5:
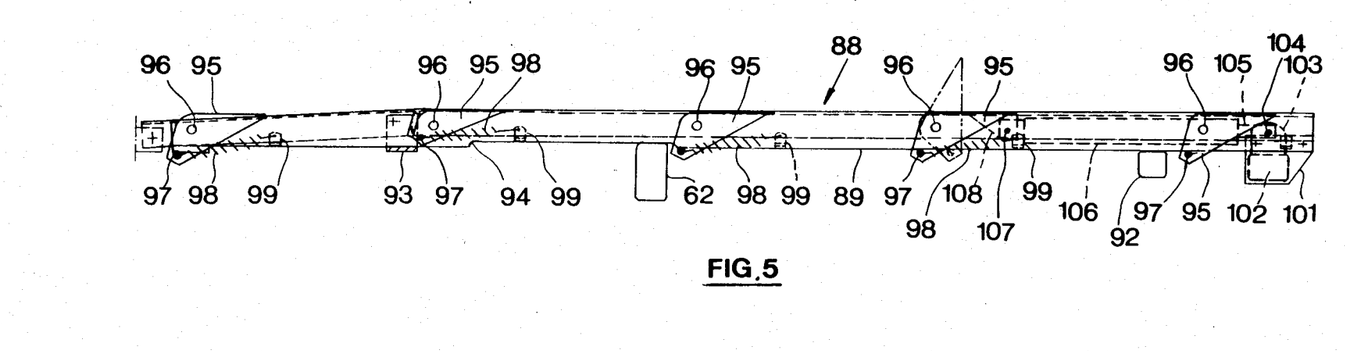
FIG. 5 is a section on the line V—V of FIG. 4.

A plurality of pairs of tines or sprags 95 are pivotally mounted at 96 at spaced intervals along each slide 89, each sprag being generally triangular in side view (FIG. 5) and each pair being interconnected by a lateral pin 97 which extends beyond one of the sprags and has an annular groove to receive one end of a spring 98 the other end of which is hooked onto a bracket 99 mounted on the associated slide 89. Thus the springs 98 constantly urge the sprags 95 in anticlockwise direction, as seen in FIG. 5, i.e. to a position in which the sprags extend beyond the surface 58 of the channel members 56A and thus into the bale case 6 to engage a bale (not shown) therein. The fully extended, operative position of the sprags 95 is shown in broken lines in FIG. 5 in respect of one sprag, the remainder being shown in the retracted, inoperative position. The sprags 95 also are shown in extended, operative positions in FIGS. 1 and 3.

The two slides 89 of the two bale-engaging means 88 each have a depending lug 101 at one end, the two lugs, and thus also the slides, being interconnected by a cross beam 102 which extends beneath the central channel member 56 of the bottom rail 48 and which is connected via a pair of lugs 103 and a pin 104 to the piston 105 of a hydraulic actuator, the cylinder 106 of which is connected by a pivot pin 107 to a pair of further lugs 108 attached to the underside of the stationary central channel 56 of the bottom rail 48.

Figure 6:
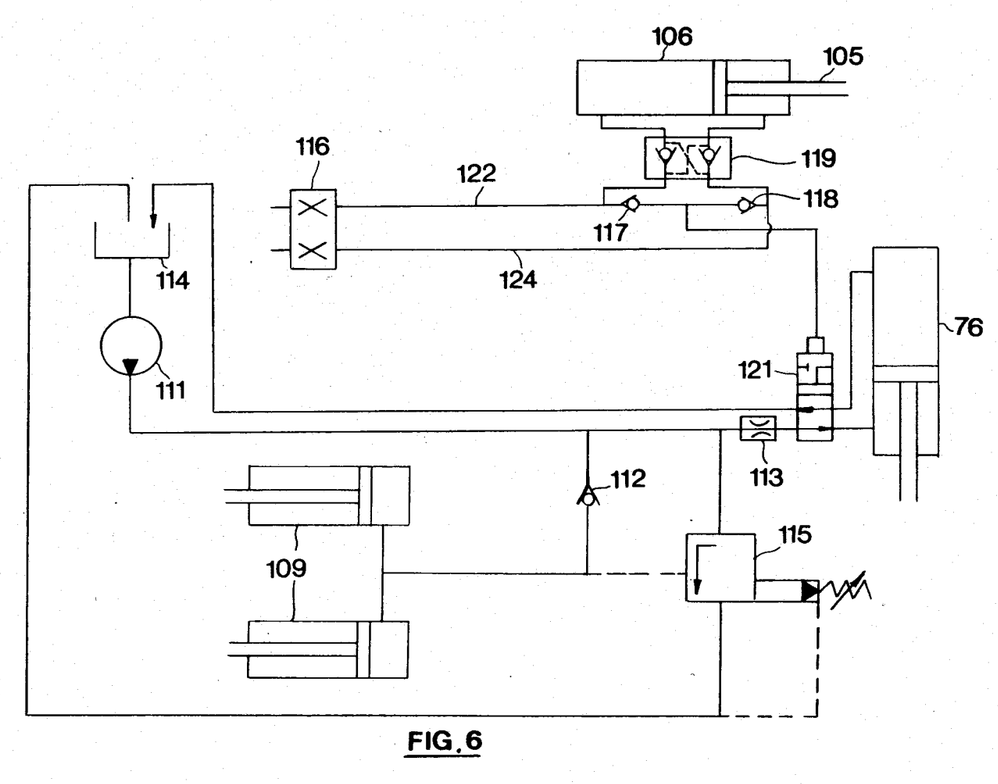
FIG. 6 is a hydraulic circuit diagram.

Turning now to FIG. 6, this shows a hydraulic circuit diagram for the operation of the bale-engaging means 88 to discharge a full or partial bale from the machine, as well as for the operation of the bale density control mechanism 60 of the baler which has not been described in full detail herein as it is the subject of co-pending U.S. application Ser. No. 020,850 filed Mar. 2, 1987, which reference has already been made. The density control mechanism 60 comprises the hydraulic actuator 76 and two sensors in the form of further actuators 109 which are operable to sense the load on the top rail 28 and control the forces applied to the bale case tension rails to control bale density.

It will be seen from FIG. 6 that the two sensors 109 are connected hydraulically in parallel, the maximum volume ends of the cylinders thereof being connected to a source of constant pressure fluid flow provided by a pump 111 via a non-return valve 112, the pump also supplying the actuator 76 of the density control mechanism 60 via a restrictor 113 which serves to damp the operation of the actuator 76 in a conventional manner. The sensors 109 are connected to a reservoir or tank 114 via an adjustable relief valve 115 which also serves to connect the actuator 76 to the tank 114.

The actuator 105, 106 of the bale-engaging means 88 is connected to the pump 111 by a changeover valve 116 provided in two pressure lines 122, 124 further also comprising a double check valve 119. Alternatively, the actuator 105, 106 also may be coupled to the tractor hydraulics in a conventional manner, in which case the valve 116 is the standard control valve in said tractor hydraulics. The pressure lines 122, 124 are coupled to each other via two non-return valves 117, 118 and a connection is taken from between the two non-return valves 117 and 118 to the control end of a two-position valve 121 connected between the ends of the actuator 76 and to the pump 111 and tank 114. Alternatively, the valve 121 may be a manually operated two-position valve, in which case the aformentioned coupling between the pressure lines 122, 124, the two non-return valves 117, 118 and the connection taken from between these non-return valves 117, 118 to the valve 121 may be dispensed with.

In operation of the baler, crop material is picked up from the ground by the pick-up mechanism 4 which feeds it to the feed chamber 5 from which it is transferred in wads to the bale chamber 6 in the normal way. Each wad of material is forced by the plunger 7 further into the bale chamber 6 and density of the bale thus formed by the accumulation of wads is controlled by the mechanism 60, the walls of the bale chamber 6 normally being continually squeezed inwardly as a result of contraction of the actuator 76 by the application of pressure fluid to the minimum volume or annular end of the actuator.

For the sake of ease of understanding, the operation of the bale density sensing and adjusting mechanism first will be described hereinafter in the hypothetical condition where the bales being formed, move continuously through the bale case 6 and therefore are subjected to a continuous load directed longitudinally of the bale case 6 and toward the discharge end thereof. Under these conditions the continual supply of pressure fluid by the pump 111 is leaked to the tank 114 by the fact that the relief valve 115 opens as soon as the supply pressure via the non-return valve 112 is exceeding the predetermined value at which the relief valve 115 is set to provide a by-pass to the tank 114 thus creating a constant system pressure. Also, should for the one or other reason the system pressure in the actuator cylinder 76 tend to creep up, said pressure would also be relayed via the non-return valve 112 to the relief valve 115, which thereby would open further to by-pass more fluid to the tank 114 to maintain the system pressure constant whereby the load on the tension rails equally is kept constant. Similarly, if to the contrary, the system pressure would tend to drop for the one or other reason, the relief valve 115 would close slightly to compensate for said system pressure drop. It will be noted that, in the normal operating condition of the baler when the friction coefficient of the crop remains the same, the pressures in the sensors 109 and the actuator 76 always are the same by virtue of the controlling operation of the pressure relief valve 115. Also under this normal operating condition, there is a continuous flow of excessive pressure fluid from the pump 111 via the pressure relief valve 115 to the tank 114.

If, still in this hypothetical condition, during operation, the load on the upper tension coil 28 increases, due to an increase in friction between the crop material being baled and the bale chamber, e.g. as a result of an increased moisture content, (or for any other reason), then there is a slight movement of the tension rail 28 longitudinally of the bale chamber 6 and thus a slight contraction of the sensor actuators 109 so as to increase the cylinder pressures.

However, this increase in pressure cannot be transmitted through the non-return valve 112 or relief valve 115 to the actuator 76 and when this isolated pressure exceeds the predetermined relief valve pressure, the latter opens further and additionally allows the pressure fluid in the sensor 109 to drain to the tank 114 and thereby also the pressure fluid in the actuator 76 to drain the tank 114 whereby the actuator 76 extends and hence opens up the bale chamber 6, e.g. increases its cross-sectional area through reverse operation of the density control mechanism 60. Accordingly, the load on the walls of the bale chamber 6 is gradually decreased, eventually to a level consistent with normal operation which will thus allow continued movement of the bale being formed through the bale chamber 6 and hence which also will allow bales of constant density to be formed. When the force on the top rail 28 of the bale chamber 6 has been relieved to this extent corresponding to the preset value of the pressure relief valve 115, said relief valve 115 closes back to its normal operating condition and the bale density control mechanism 60 resumes its normal operation at a different setting.

If to the contrary, the load on the upper tension rail 28 decreases during operation due to a decrease in friction between the crop material being baled and the bale chamber 6, e.g. as a result of a decreased moisture content (or for any other reason), then there is a corresponding pressure drop within the cylinders 109. Under these conditions the pressure relief valve 115 will not open further to drain pressure fluid until the predetermined system pressure is reached; i.e. the pump 111 will supply pressure fluid to the actuator 76 to contract the same and hence also to decrease the cross-sectional dimensions of the bale chamber 6. Accordingly, the bales being formed will be subjected to an increased resistance against moving through the bale case 6 whereby the bale density will be increased accordingly until eventually the level thereof is consistent with the desired density as set with the setting of the pressure relief valve 115 and at which time the pressure relief valve 115 will open to drain further pressure fluid being supplied by the pump 111 and thus to prevent further contraction of the actuator 76.

The coefficient of friction of crop material normally can vary between 0.25 for very dry straw and 0.70 for wet silage. The sensing cylinders 109 preferably are dimensioned such that a pressure increase therein over and above the system working pressure and resulting from a frictional force between the bales being formed and the bale case walls associated with a coefficient of friction of 0.25, is sufficiently large to operate the pressure relief valve 115 i.e. to open said valve to drain pressure fluid. Thereby the bale density control system is operable to maintain the bale density generally at any desired value as set by means of the pressure relief valve under all operating conditions.

Turning now to the actual operation of the baler, it will be appreciated that bales being formed are moved intermittently through the bale case 6, rather than continuously, by the plunger 7 which is reciprocated back-and-forth in said bale case. The compressing force and pressure on the bales being formed thus continuously oscillates and the maximum peak loads depend on the resistance experienced by the bales against movement through the bale case 6. This in turn largely depends on the setting of the tension rails 28, 38 and 48 and the frictional forces between the bales being formed and said tension rails. With an increased resistance, wads of crop material are compressed more and thus a higher bale density is obtained.

In practice, the relief valve 115 is opened to a larger or less degree, dependent on the friction forces, during each compression stroke of the plunger 7 to leak a larger or smaller slug of pressure fluid from the actuator 76 to the tank 114 resulting in a corresponding expansion of the bale case 6 so as to top off the resistance against bale movement to a larger or lesser degree and to the predetermined value corresponding to the desired bale density, whereby the bales being formed are moved through the bale case 6 during each plunger compression stroke through a longer or shorter distance so as to level out the bale density. During each retraction stroke of the plunger 7, when the bales being formed do not move through the bale case 6 and thus also no friction forces are sensed by the sensing cylinders 109, the hydraulic pump 111 again supplies pressure fluid to the actuator 76 thus retracting said actuator until eventually the system pressure is restored whereafter the pressure relief valve 115 is opened.

Thus, in summary, the system under normal operating conditions is operated during each plunger cycle to a larger or lesser degree whereby the desired bale density is approximated. In other words, the density control system 60 breathes during each plunger cycle to the extent that the actuator 76 is extended to a larger or lesser amount during each compressing stroke and subsequently is retracted during each return stroke of the plunger.

So far the bale density controlling part of the hydraulic circuitry of FIG. 6 has been described. Turning now to the bale discharging part of this circuitry, it is known in the art of balers that, at the end of a baling session there is always a full or partially formed bale in the baler and, if the crop material has a high moisture content, for example if it is silage, and if this full or partially formed bale is left in the machine for any length of time, the crop material therein will commence to ferment and accelerate the onset of rust in the machine. Under these circumstances the last bale (whether full or incomplete) needs to be removed and therefore the bale-engaging means 88 are deployed. However before this is done and provided an incompletely formed bale is present in the bale case, the knotter trip mechanism is actuated to wrap twine around the incompletely formed bale. Thereafter, the actuator 105, 106 is operated by the machine operator from the tractor (or other towing vehicle) cab by way of actuating the valve 116 so as to supply pressure fluid on a line 122 to the maximum volume (cylinder) end of the actuator via the double check valve 119. Thus the actuator 105, 106 is extended and at the same time, pressure fluid is admitted via the non-return valve 117 to the control end of the valve 121 to change it over from the position of FIG. 6 to the position in which the tank connection is blocked and the pressure connection is to both ends of the actuator 76. In the alternative arrangement where the valve 121 is not coupled to the pressure lines 122, 124, the operator, of course, must manually shift this valve 121 to its other position. This results in the actuator extending (due to equal pressure on the differential areas) and hence releasing the bale density control means 60 as already explained.

More particularly, the side rails 38 are moved apart and the cylinder of the actuator 76 is raised by virtue and the extension of the actuator and this movement is used physically to raise the top rail 28 out of contact with the bale to be removed by a chain 123 which interconnects these two components. Thus the bale to be discharged is not gripped by the side rails 38 or top rail 28 and rests only on the bottom rail 48, including the two slides 89 of the bale-engaging means 88.

As the actuator 105, 106 extends and thus performs a stroke, the piston 105 thereof carries with it the two slides 89 which are connected thereto via the lugs 103, the cross beam 102 and the lugs 101. The movement of the slides 89 (to the right as seen in FIG. 5) allows the springs 98 associated with the sprags 95 to contract whereby the latter are rotated anticlockwise (as seen in FIG. 5) so that they project above the bottom rail 48 and hence engage the bale to be removed; the initial relative movement between the slides 89 and the bale serving to rotate the sprags 95 fully to the operative solution in which they enter and bite into the bale whereafter further movement of the bale-engaging means 88 moves the bale rearwardly along the bale case.

At the end of the first stroke of the actuator 105, 106, the valve 116 is changed over so as to supply pressure fluid to the piston end of the actuator 105, 106 via the line 124 and check valve 119. This changing over of the valve 116 may be accomplished either manually by the operator or alternatively, automatically in a conventional manner by using the movement of the slides 89. In the latter case the position of the valve 116 is changed over by the slide 89 where reaching the one or other end of stroke position. Accordingly, the slides 89 are now driven in the reverse direction (to the left as seen in FIG. 5) whereupon the sprags 95 automatically disengage the bale because they rotate clockwise about their pivots 97 and hence the slides can return to their initial positions. While that the actuator 105, 106 is contracted and provided the valve 121 is coupled to the pressure lines 122, 124 in the manner as shown in FIG. 6 (as opposed to being a manually controlled valve), pressure fluid is also admitted via the non-return valve 118 to the control end of the valve 121 which thus is maintained in the position it was moved into during the preceding working stroke of the actuator 105, 106. The bale case 6 thus is kept in the bale relieving position. At the end of the return stroke, the valve 116 is again changed over to effect another working stroke of the actuator 105, 106 and so on until the bale has been discharged from the machine. After the bale has been discharged from the bale case 6 and the valve 116 is no longer actuated to apply pressure to any one of the lines 122, 124, the valve 121 automatically returns to the position shown in FIG. 6 in the absence of any shifting pressure at the control end thereof.

It will be appreciated that during normal baling operation of the machine it is imperative that the valve 121 remains in the position of FIG. 6 and is not changed to the alternative position which it has to adopt when the bale-engaging means 88 are rendered operative. This changeover might be a possibility during normal baling because bales are continually moving over the bale case bottom rail 48 and hence engaging the slides 89 tending to move them to the right as seen in FIG. 5 and thus also tending to extend the actuator 105, 106. If any extension of this actuator 105, 106 were to take place becaues of this action, then the valve 121 would be actuated and so, to prevent this, the double check valve 119 is employed.

It should be noted that the slides 89 extend beyond the discharge end of the bale case 6 during each working stroke of the actuator 105, 106 and thus support the bale accordingly although the support is lost during each return stroke. The stroke of the actuator 105, 106 (for example 300 mm) is made less than the separation between adjacent sprags 95 (for example 400 mm) so that each time the sprags re-engage the bale to be moved, they do not enter the bale at the same places as did the adjacent sprags during the last preceding working stroke which might detract from the effective bite of the sprags into the bale because of the bale surface at the locations of the bits being torn by the repeated penetration by the sprags.

Furthermore, it should be noted that each pair of sprags 95 is interconnected by the associated pin 97 which acts as a stop, in cooperation with the underside of the related slide 89, to limit both the clockwise and anticlockwise movements of the sprags.

The present invention provides highly effective means for discharging a full or partial bale left in a machine after baling session although, of course, the discharge means can be employed to effect the bale discharge at any other time if desired. Accordingly, the problems of fermentation within the closed environment of the bale case and the increasing onset of rust caused by leaving bales of moist crop material in the machine for any extended period of time are obviated.

It will be understood that changes to the details, materials, steps and arrangement of parts which have been described and illustrated to explain the nature of this invention will occur to and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention.

As an example the reciprocable bale-discharge means in accordance with the preferred embodiment of the invention described hereabove in all details may be replaced by one, or preferably a plurality of rotatable bale discharge means associated with at least one wall of the bale case. In the event a plurality of rotatable bale discharge means are provided, said bale discharge means are spaced apart along the length of the bale case.

Figure 7:
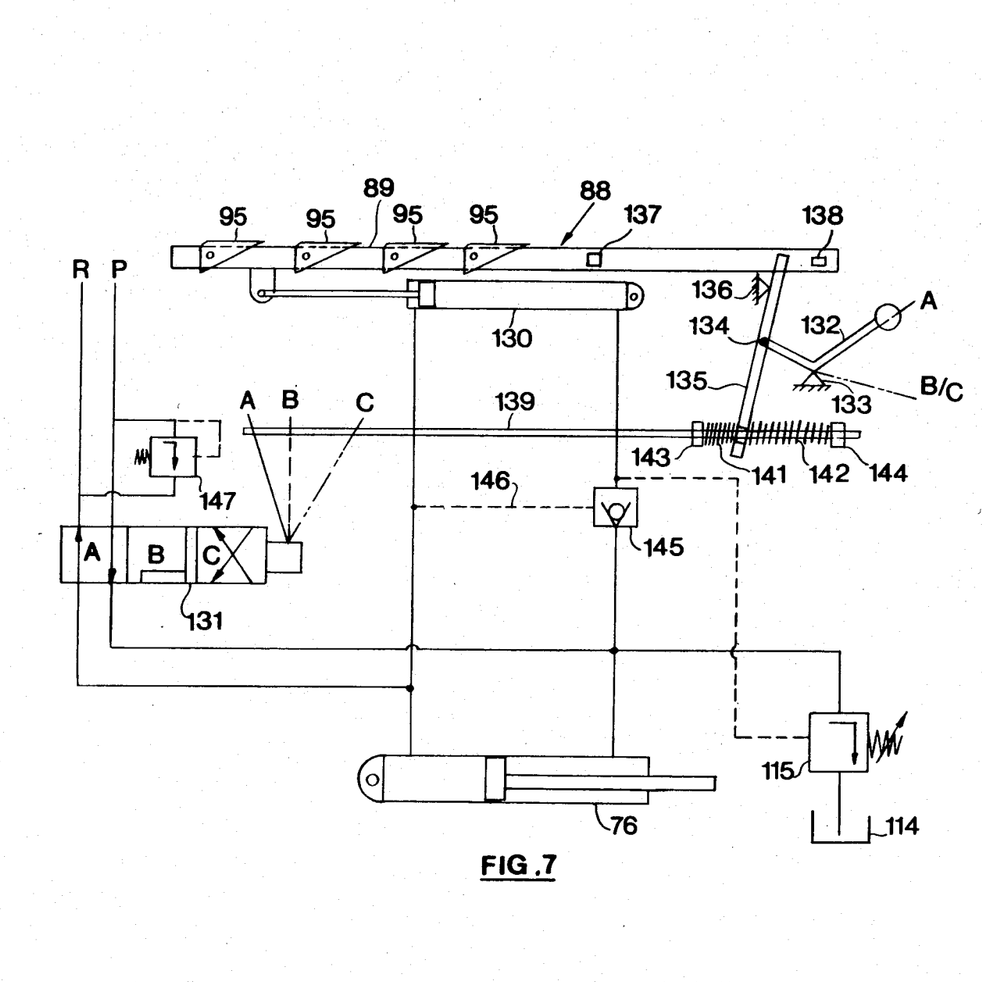
FIG. 7 is a schematic view including a hydraulic circuit diagram of an alternative embodiment.

Another example of an alternative arrangement is shown in FIG. 7. In this arrangement the bale discharge means 88 and the bale density control means 60 have been combined and comprises only one hydraulic actuator 130 which replaces both the sensing cylinders 109 and the bale discharge cylinder 105, 106 of the arrangement according to FIGS. 1-6. Like components in the arrangements shown in FIGS. 1-6, respectively FIG. 7 have been indicated with like reference numerals.

The hydraulic circuitry of FIG. 7 comprises a three position control valve 131 which is positionable in a position A during the baling operation and which is shifted back-and-forth between positions B and C during the bale discharge operation. The position of this valve is controlled by a handle 132 which is manually positionable in either a position A or a position B/C. The handle 132 is pivotally mounted on the chassis at 133 and is pivotally coupled at 134 to a lever 135 which itself is engageable adjacent one end with a first stop 136 on the chassis and second and third stops 137, 138 on a slide member 89. At its other end, the lever 135 slidably receives a control rod 139; coil springs 141, 142 being provided coaxially therewith and at opposite sides of said other end of the lever 135 for engagement therewith. The springs 141, 142 abut against respective stops 143, 144 on the control rod 139.

With the valve 131 in the position A, the pressure line P is coupled to the piston side of the actuator 76 of the bale density control mechanism 60 as also is the case in the arrangement according to FIGS. 1-6. This pressure line P further also is coupled to the pressure relief valve 115 in the same way as in the arrangement shown in FIGS. 1-6. The pressure line P finally also is coupled via a pilot operated check valve 145 to the cylinder side of the pressure sensing and bale discharge actuator 130. The function of the check valve 145 in the bale density controlling mode of the circuitry is identical to the function of the non-return valve 112 in the arrangement according to FIGS. 1-6.

In the A position of the valve 131, the piston side of the actuator 130 and the cylinder side of the actuator 76 are coupled to the return line R, with a by-pass 146 also coupling these sides of the cylinders 130 and 76 to the check valve 145 to control the operation thereof. A pressure relief valve 147 is provided forwardly of the valve 131 between the pressure and return lines P and R respectively to protect the system against overpressure.

During the baling operation, the handle 132 is placed in the A position as already said, to thereby position the valve 131 in the corresponding A position as well. In this operating mode, the hydraulic actuator 130 is virtually fully extended and operates as a bale density sensing device in precisely the same manner as the sensors 109 of the arrangement shown in FIGS. 1-6. To this end, the tines 95 should be arranged to engage with their top surface the underside of bales being formed in the bale chamber whereby frictional forces are transmitted to the plunger rod of the actuator 130.

Hydraulic pressure fluid is supplied via the valve 131 under a constant flow to the system including the pressure relief valve 115, the check valve 145, the cylinder side of the actuator 130 and the plunger side of the actuator 76. This system operates in precisely the same manner as the hydraulic bale density control system shown in FIGS. 1-6 and described hereabove and thus, this operation should not be described here anymore.

Turning now to the bale discharge mode, the handle 132 is pivoted to the B/C position whereby the lever 135 is pulled away from the stop 136 to engage the stop 138 on one of the slide members 89. Thereby the control rod 139 is pulled to the right as seen in FIG. 7 (under compression of the spring 142) resulting in the valve 131 to be shifted to the C position. This in turn results in the reversal of the pressure and return lines with pressure now being applied to the check valve 145 to open the latter and with the relief valve 115 being closed completely due to the pressure drop at its pressure sensing input. As a result of this shifting, the actuator 76 is extended to permit the tension rails 28, 38 to open up and the actuator 130 is retracted to commence the bale discharge operation by a shifting movement of the slide members 89 to the right as seen in FIG. 7. As the slide members 89 approach their rearmost position (as seen relative to the bale chamber), the stop 137 engages the lever 135 which then is pivoted around pivot 134 in the clockwise direction, again as seen in FIG. 7, whereby the valve 131 is shifted to the B position. In this B position of the valve 131, the same pressure is applied to both sides of both actuators 76 and 130. Because of the differential surfaces upon which the same pressure is applied, the actuator 76 remains fully extended thus maintaining the opened up position of the tension rails 28 and 38. For the same reason, the actuator is retracted; this retraction being effected at a high speed due to the fact that the pressure fluid from the piston side of the cylinder is fed to the opposite side of the plunger via the check valve 145 together with the other pressure fluid coming directly from the valve 131. During this return movement of the slide members 89, the relief valve 115 continuously remains fully closed.

As the slide members 89 approach their fully retracted position, (i.e. with the actuator 130 fully extended) the third stop 138 engages the lever 135 which thereby is pivoted around pivot 134 in the anti-clockwise direction (as seen in FIG. 7) thus shifting the valve 131 back to the C position, whereby, as already explained, the bale discharge means 88 make another operative stroke. This switching back-and-forth of the valve 131 between the B and C positions is continued until the last bale in the bale chamber is discharged whereafter the operator pivots the handle 132 back to the A position to shift the valve 131 back to the A position as well as whereby the whole system is set back in the baling and bale density control mode. As the handle 132 is set back to the A position, the lever 135 again engages the stop 136 on the chassis.

Having thus described the invention, what is claimed is:

1. In an agricultural baler comprising a bale case having a discharge end and a plunger reciprocable in the bale case for, in use of the baler, forming crop material into bales and moving said bales along the bale case towards the discharge end thereof for ultimate discharge therefrom, an improvement which comprises:
    bale-discharge means associated with the bale case and operable to engage a formed or partially formed bale in the bale case and move it therealong towards the discharge and thereof independently of the operation of the plunger; and
    wherein the bale-discharge means comprises reciprocable and retractable bale-engaging means associated with at least one wall of the bale case and which are operable, during one stroke of reciprocation, in an operative mode to engage a formed or partially formed bale in the bale case and move it therealong towards the discharge end thereof and, in an inoperative mode, to disengage said bale.

2. In a baler according to claim 1, wherein the bale-engaging means are operable to extend into the bale case during the operative mode to engage said bale therein and to retract from the bale case during the inoperative mode to disengage said bale.

3. In a baler according to claim 2 wherein the bale-discharge means are associated with a floor of the bale case and the bale-engaging means of the bale-discharge means extend beyond said floor and into the bale case in the operative mode.

4. In a baler according to claim 3 wherein the bale-engaging means are spaced along the reciprocable slide means relative to the stroke of reciprocation of the bale-discharge means so that a given bale-engaging means does not re-engage a bale at the same location previously engaged by an adjacent bale-engaging means.

5. In a baler according to claim 2 wherein the bale-discharge means comprise reciprocable slide means on which are pivotally mounted, at regular intervals along the length thereof, bale-engaging means which extend into and engage a bale in the operative mode of operation of the bale-discharge means.

6. In a baler according to claim 5 wherein spring means extend between the slide means and the bale-engaging means to resiliently load said bale-engaging means such that they are urged towards an operative position.

7. In a baler according to claim 6, wherein the bale-engaging means are provided with stop means which are engageable with the slide means so as to limit pivotal movement of the bale-engaging means in at least one direction.

8. In a baler according to claim 7, wherein:
the slide means comprise two generally parallel slides extending longitudinally of the bale case and being interconnected for reciprocation in unison;
the bale-engaging means are formed by pairs of tines of generally triangular shape as seen in plan view; each pair of tines being mounted via a common pivot on a respective slide and
the stop means are formed by a pin attached to at least one tine of each pair of tines; said pin being engageable with the respective slide and also serving as an anchor point for one end of the spring means.

9. In a baler according to claim 1 wherein the bale-discharge means are reciprocated by a double-acting hydraulic actuator.

10. In a baler according to claim 9, wherein the improvement further comprises bale-density control means including:
tensioning rails forming part of the bale case, and a further hydraulic actuator operable to move the tensioning rails towards each other to control the density of a bale being formed in the bale case and;
whereby the hydraulic actuator of the bale-discharge means and further hydraulic actuator of the bale-density control means form part of a hydraulic circuitry which further comprises control valve means coupled between said actuator and further actuator for automatically shifting the further actuator to a bale-density release position when the actuator of the bale-discharge means is energized for operating said bale-discharge means so as to maximize the cross-sectional area of the bale case.

11. In a baler according to claim 10, wherein:
the further actuator is formed by a double-acting hydraulic cylinder; and
the control valve means is a two-position valve coupling, in its one position, the further actuator at its piston rod side to a pressure source and at its cylinder side to a hydraulic pressure fluid tank and coupling, in its other position, said further actuator at both sides of its plunger to said pressure source; said valve further having its control end coupled to the actuator of the bale discharge means.

12. In a baler according to claim 11, wherein the hydraulic actuator of the bale-discharge means is connectable to a source of fluid pressure via a change-over valve coupled by pressure lines to both sides of said hydraulic actuator of the bale-discharge means; the control end of the control valve means being connected to both lines via a pair of opposing non-return valves disposed to permit the transfer of pressure from the change-over valve to the control end of the control valve means.

13. In a baler according to claim 12, wherein both pressure lines of the hydraulic actuator of the bale-discharge means are coupled to said actuator via a double check valve which is operable to ensure that the control valve means is not operated if any extension of the actuator is effected due to movement of the bale-discharge means by a bale moving along the bale case during the normal bale-forming operation of the baler.

14. In a baler according to claim 9, wherein the improvement further comprises a bale-density control means including:
tensioning rails forming part of the bale case, and a further hydraulic actuator operable to move the tensioning rails towards each other to control the density of a bale being formed in the bale case, and whereby the hydraulic actuator of the bale-discharge means and the further hydraulic actuator of the bale-density control means forming part of a hydraulic circuitry and the hydraulic actuator of the bale-discharge means are operable to sense variations in the density of a bale being formed in the bale case during the baling operation and to steer the hydraulic circuitry in response thereto so as to regulate the pressure fluid flow to and from the further hydraulic actuator in a manner to maintain the bale density substantially constant.

* * * * *